(12) United States Patent
Maezawa

(10) Patent No.: US 8,547,973 B2
(45) Date of Patent: Oct. 1, 2013

(54) COMMUNICATION DEVICE, COMMUNICATION SYSTEM, AND COMPUTER READABLE MEDIUM

(75) Inventor: Toshiyuki Maezawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 123 days.

(21) Appl. No.: 13/035,643

(22) Filed: Feb. 25, 2011

(65) Prior Publication Data

US 2012/0051357 A1 Mar. 1, 2012

(30) Foreign Application Priority Data

Aug. 26, 2010 (JP) ................................ 2010-189713

(51) Int. Cl.
*H04L 12/28* (2006.01)

(52) U.S. Cl.
USPC .......................................................... 370/389

(58) Field of Classification Search
USPC .......................................................... 370/389
See application file for complete search history.

(56) References Cited

U.S. PATENT DOCUMENTS

| | | | |
|---|---|---|---|
| 5,023,868 A * | 6/1991 | Davidson et al. ............. | 370/270 |
| 5,345,228 A * | 9/1994 | Franaszek et al. ........... | 340/2.25 |
| 7,007,296 B2 * | 2/2006 | Rakib .......................... | 725/111 |
| 7,231,031 B2 * | 6/2007 | Verbil et al. ............. | 379/215.01 |
| 7,912,193 B2 * | 3/2011 | Chingon et al. ......... | 379/142.08 |
| 2003/0190028 A1 * | 10/2003 | Maciejewski et al. ... | 379/215.01 |
| 2005/0117726 A1 * | 6/2005 | DeMent et al. .......... | 379/142.01 |
| 2008/0089316 A1 * | 4/2008 | Reams .......................... | 370/352 |
| 2008/0107101 A1 * | 5/2008 | Liu ............................... | 370/352 |

FOREIGN PATENT DOCUMENTS

| | | |
|---|---|---|
| JP | 2006-074203 A | 3/2006 |
| JP | 2006-295559 A | 10/2006 |

OTHER PUBLICATIONS

Communication from the Japanese Patent Office dated Oct. 16, 2012, in a counterpart application No. 2010-189713.

* cited by examiner

*Primary Examiner* — Hassan Phillips
*Assistant Examiner* — Siren Wei
(74) *Attorney, Agent, or Firm* — Sughrue Mion, PLLC

(57) ABSTRACT

A communication device includes a request receiving module and a response output module. The request receiving module receives a communication start request which is output from a given communication device and passes through a relay device. The response output module outputs a response to the communication start request to the given communication device through the relay device. The relay device outputs the response to the given communication device in preference to a notification indicating a connection rejection in arbitration processing, executed by the relay device, between information to be output from the relay device in case where the request receiving module receives the communication start request while communicating with a communication device other than the given communication device.

15 Claims, 4 Drawing Sheets

COMMUNICATION DEVICE, COMMUNICATION SYSTEM, AND COMPUTER READABLE MEDIUM

CROSS-REFERENCE TO RELATED APPLICATIONS

This application is based upon and claims priority under 35 USC 119 from Japanese Patent Application No. 2010-189713, filed Aug. 26, 2010.

BACKGROUND

1. Technical Field

This invention relates to a communication device, a communication system, and a computer readable medium.

2. Related Art

An IP facsimile machine for conducting digital communications of image information using an Internet protocol exists. Some IP facsimile machines can conduct not only digital communications of image information using the Internet protocol, but also analog communications of image information via a public telephone switch line. Such an IP facsimile machine includes not only a communication interface compatible with the Internet protocol such as a LAN card, but also a communication interface compatible with the public telephone switch line such as analog facsimile communication card.

In recent years, communications have been conducted between facsimile machines using a next generation network (NGN) of a base network for providing new information communication service in which fixed communications and mobile communications are merged and telephone, data communications, and streaming broadcast are merged. A repeater such as a home gateway device may be used as a device for relaying communications between the next generation network and the IP facsimile machine.

When a repeater such as a home gateway device relays communications between the next generation network and the IP facsimile machine, generally an optical fiber connected to the next generation network is connected to the corresponding port of the repeater. A LAN cable connected to a LAN card included by the IP facsimile machine and a modular cable connected to an analog facsimile communication card included by the IP facsimile machine are connected to the corresponding ports of the repeater. When analog communications are conducted between the IP facsimile machines, analog-digital conversion and digital-analog conversion are performed in the repeater.

When a communication start request according to the Internet protocol (for example, INVITE request in SIP (Session Initiation Protocol)) is transmitted from an IP facsimile machine to an associated IP facsimile machine via the next generation network, one repeater places the start request in all ports of the repeater as an incoming call and transmits a response determined by executing arbitration processing among responses when the responses from all ports are complete (for example, response determined based on predetermined priority) to the IP facsimile machine transmitting the start request.

When the communication start request is transmitted to the associated IP facsimile machine while the associated IP facsimile machine is communicating with another facsimile machine, arbitration processing is performed between a response indicating communicating from the LAN port of the repeater (for example, 486 response in SIP) and a response indicating communication rejection from the analog port of the repeater (for example, 488 response in SIP), whereby the response indicating communication rejection (for example, 488 response in SIP) may be transmitted to the IP facsimile machine transmitting the start request.

SUMMARY OF THE INVENTION

According to an aspect of the invention, a communication device includes a request receiving module and a response output module. The request receiving module receives a communication start request which is output from a given communication device and passes through a relay device. The response output module outputs a response to the communication star request to the given communication device through the relay device. The relay device outputs the response to the given communication device in preference to a notification indicating a connection rejection in arbitration processing, executed by the relay device, between information to be output from the relay device in case where the request receiving module receives the communication start request while communicating with a communication device other than the given communication device.

BRIEF DESCRIPTION OF THE DRAWINGS

Exemplary embodiments of the invention will be described in detail based on the following figures, wherein.

DETAILED DESCRIPTION

Figure 1:
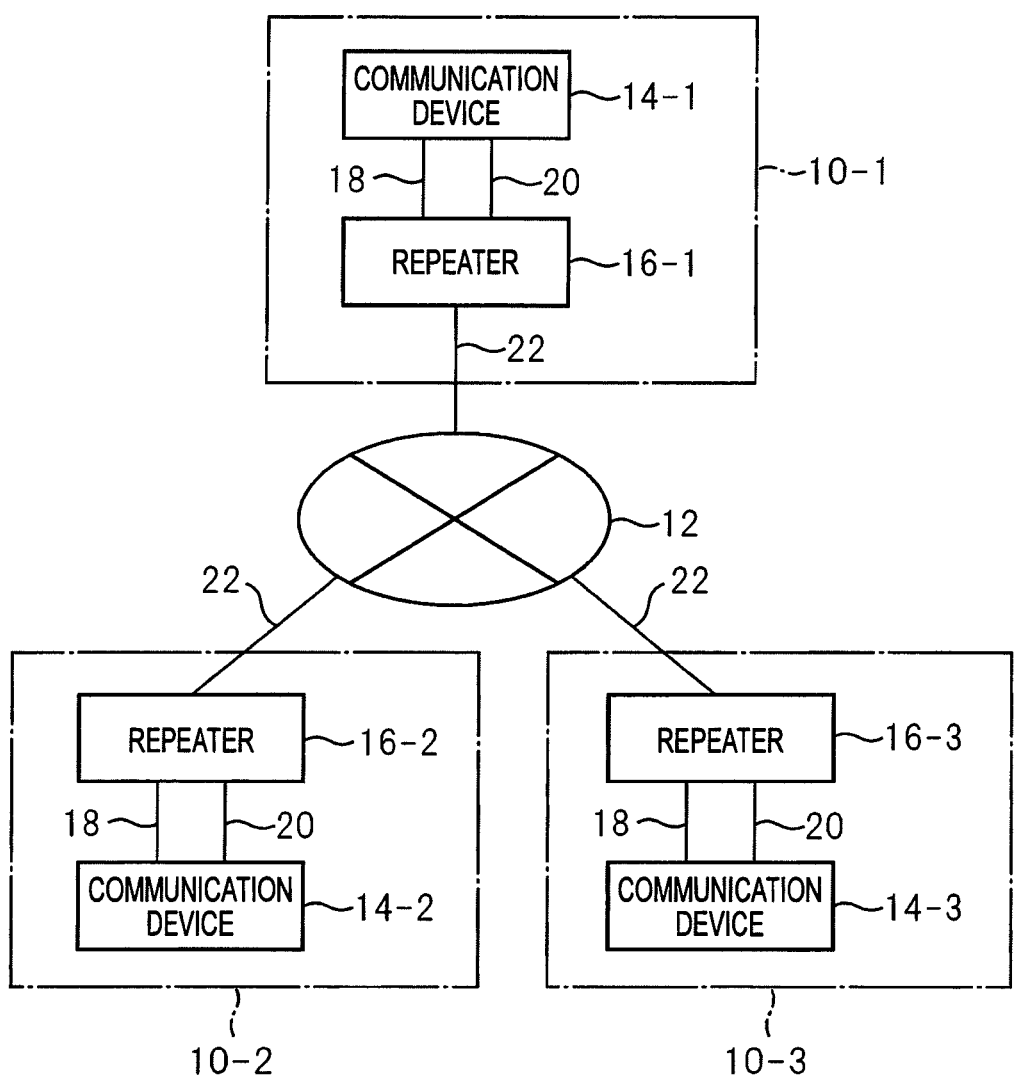
FIG. 1 is a drawing to show an example of the general configuration of an exemplary embodiment of the invention.

An exemplary embodiment of the invention will be discussed below in detail based on the accompanying drawings:

FIG. 1 is a drawing to show an example of the general configuration of an exemplary embodiment of the invention. As illustrated in FIG. 1, a first communication system 10-1, a second communication system 10-2, and a third communication system 10-3 are connected to communication means (in the exemplary embodiment, for example, next generation network (NGN) 12) and communicate with each other. The first communication system 10-1 includes a first communication device 14-1 and a first repeater 16-1; the second communication system 10-2 includes a second communication device 14-2 and a second repeater 16-2; and a third communication system 10-3 includes a third communication device 14-3 and a third repeater 16-3.

The communication device 14 is, for example, an IP facsimile machine and is made up of a control section of a program control device of a CPU, etc., operating in accordance with a program installed in the communication device 14, a storage section of storage elements of ROM, RAM, etc., a hard disk drive, etc., a read section for reading an image formed on a surface of a sheet, a print section for printing a sheet on which an image received from another communication device 14, a digital communication section of a communication interface for digital communications such as a LAN card, and an analog communication section of a communication interface for analog communications such as an analog facsimile communication card. The components are connected through a bus.

The repeater 16 is, for example, a home gateway device for repeating communications between the communication devices 14 through the NGN 12 and is made up of a control section of a program control device of a CPU, etc., operating in accordance with a program installed in the communication device 14, a storage section of storage elements of ROM, RAM, etc., a hard disk drive, etc., a first port of a communication port used for digital communications with the communication device 14, a second port of a communication port used for analog communications with the communication device 14, and a third port of a communication port used for digital communications with the NGN 12.

The first port of the repeater 16 and the digital communication section of the communication device 14 are connected by a digital communication cable (in the exemplary embodiment, for example, a LAN cable 18). The second port of the repeater 16 and the analog communication section of the communication device 14 are connected by an analog communication cable (in the exemplary embodiment, for example, a modular cable 20). The third port of the repeater 16 and the NGN 12 are connected by an optical fiber 22 in the exemplary embodiment, for example.

Figure 2:
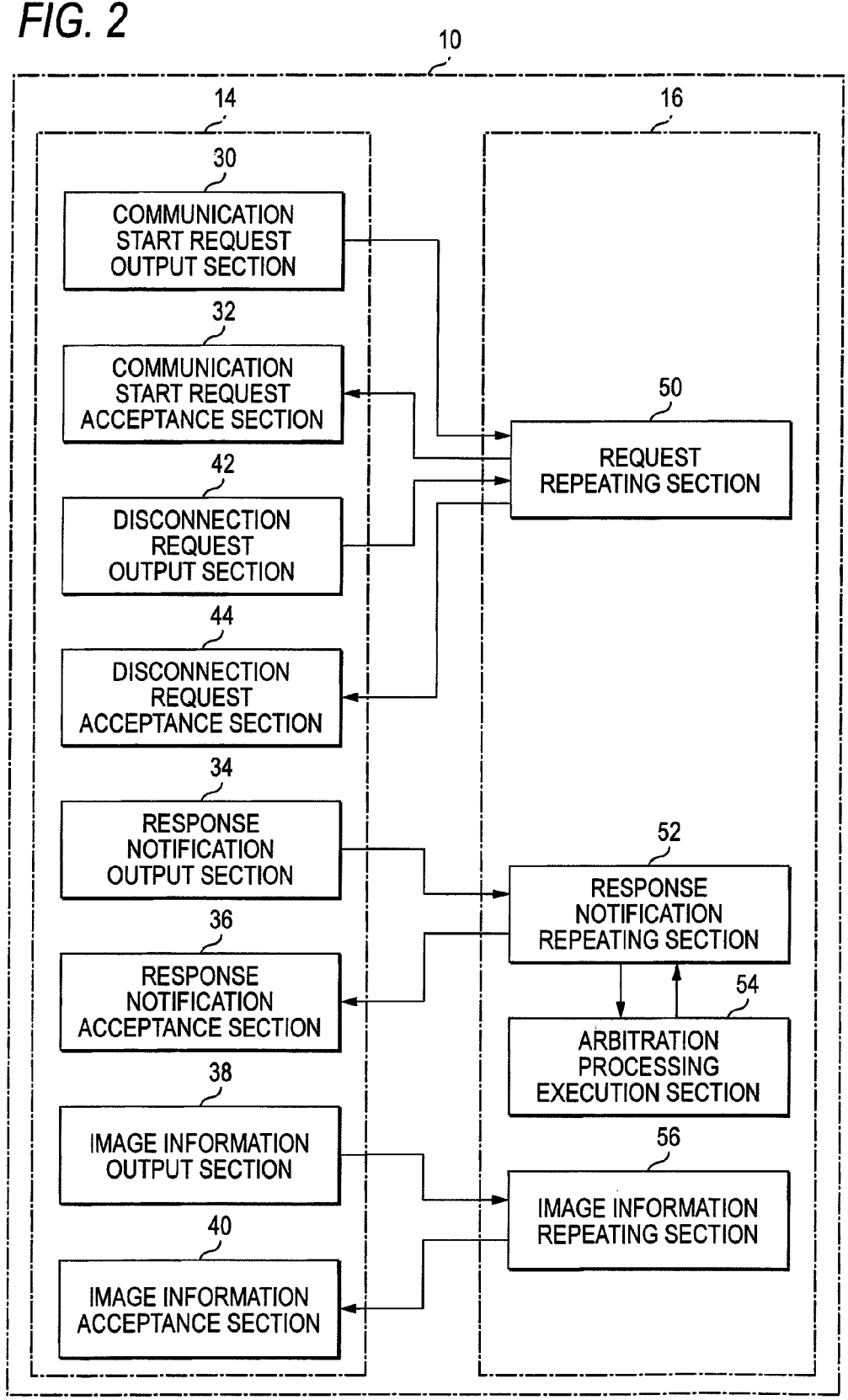
FIG. 2 is a function block diagram to show an example of the function realized by a communication system according to the exemplary embodiment of the invention.

FIG. 2 is a function block diagram to show an example of the function realized by the communication system 10 according to the exemplary embodiment of the invention. As illustrated in FIG. 2, the communication device 14 includes a communication start request output section 30, a communication start request acceptance section 32, a response notification output section 34, a response notification acceptance section 36, an image information output section 38, an image information acceptance section 40, a disconnection request output section 42, and a disconnection request acceptance section 44. The repeater 16 includes a request repeating section 50, a response notification repeating section 52, an arbitration processing execution section 54, and an image information repeating section 56.

The components are realized as control sections of the communication device 14 and the repeater 16 of computer executed programs installed in the communication device 14 and the repeater 16. The programs are supplied to the communication device 14 and the repeater 16, for example, through a computer-readable information storage medium of a CD-ROM, a DVD-ROM, etc., or through communication means of the Internet, etc.

Figure 3:
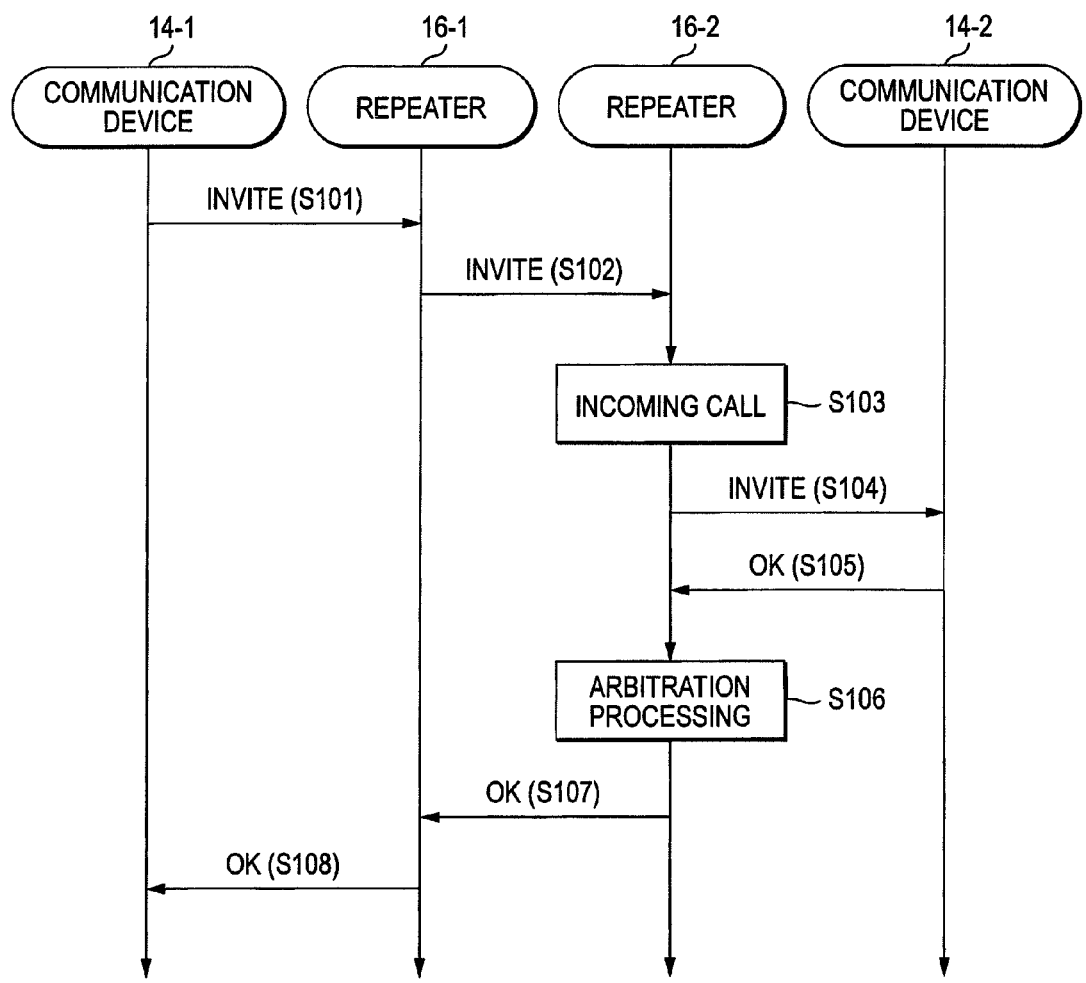
FIG. 3 is a flowchart to show an example of a flow of processing performed by the communication system according to the exemplary embodiment of the invention.

An example of a flow of processing performed in the communication system 10 according to the exemplary embodiment will be discussed with reference to a flowchart of FIG. 3. In the processing example, an example of a processing flow when the first communication device 14-1 transmits a communication start request to the second communication device 14-2 when the second communication device 14-2 is not communicating with the third communication device 14-3.

First, the communication start request output section 30 of the first communication device 14-1 outputs a communication start request (in the processing example, INVITE request in SIP (Session Initiation Protocol)) for requesting the second communication device 14-2 to start IP facsimile communications (for example, communications based on T.38 protocol) (S101). The request repeating section 50 of the first repeater 16-1 relays the communication start request so that the communication start request arrives at the second repeater 16-2 via the NGN 12 (S102).

When the request repeating section 50 of the second repeater 16-2 accepts the communication start request, the request repeating section 50 places the communication start request in the first port and the second port of the second repeater 16-2 as an incoming call (S103). Since the first port of the second repeater 16-2 is a communication port used for digital communications, the request repeating section 50 of the second repeater 16-2 relays the communication start request from the first port to the second communication device 14-2 (S104). On the other hand, since the second port of the second repeater 16-2 is a communication port used for analog communications, the second port of the second repeater 16-2 outputs a response notification indicating connection rejection (in the processing example, a notification that the value of response code in SIP is 488 (Not Acceptable Here)) to the response notification repeating section 52 of the second repeater 16-2 without outputting the communication start request to the second communication device 14-2.

When the communication start request acceptance section of the second communication device 14-2 accepts the communication start request output from the first port of the second repeater 16-2, the response notification output section 34 of the second communication device 14-2 outputs a response notification indicating that communication with the first communication device 14-1 are acceptable (for example, notification of definite response that the value of response code in SIP is 200 (OK)) to the first communication device 14-1. The response notification repeating section 52 of the second repeater 16-2 accepts the response notification through the first port (S105).

The arbitration processing execution section 54 of the second repeater 16-2 executes arbitration processing between the response notification indicating that communications are acceptable, accepted by the response notification repeating section 52 from the first port and the response notification indicating connection rejection accepted by the response notification repeating section 52 from the second port (S106). In the exemplary embodiment, the arbitration processing execution section 54 determines that the response notification indicating that communications are acceptable has higher priority than the response notification indicating connection rejection, and commands the response notification repeating section 52 of the second repeater 16-2 to output the response notification indicating that communications are acceptable to the first communication device 14-1.

The response notification repeating section 52 of the second repeater 16-2 outputs the response notification indicating that communications are acceptable destined for the first communication device 14-1 to the first repeater 16-1 via the NGN 12 (S107). The response notification repeating section 52 of the first repeater 16-1 relays the response notification to the first communication device 14-1. The response notification acceptance section 36 of the first communication device 14-1 accepts the response notification through the first port of the first communication device 14-1 (S108).

Then, the image information output section 38 of the first communication device 14-1 outputs image information to be output to the second communication device 14-2 via the image information repeating section 56 of the first repeater 16-1 and the image information repeating section 56 of the second repeater 16-2. The image information acceptance section 40 of the second communication device 14-2 accepts the image information. The image information is thus transmitted from the first communication device 14-1 to the second communication device 14-2.

The disconnection request output section 42 of the first communication device 14-1 outputs a disconnection request to the second communication device 14-2 via the request repeating section 50 of the first repeater 16-1 and the request repeating section 50 of the second repeater 16-2. The disconnection request acceptance section 44 of the second communication device 14-2 accepts the disconnection request. The response notification output section 34 of the second communication device 14-2 outputs a line disconnection notification to the first communication device 14-1 via the response notification repeating section 52 of the second repeater 16-2 and the response notification repeating section of the first repeater 16-1. The response notification acceptance section 36 of the first communication device 14-1 accepts the notification. The communications between the first communication device 14-1 and the second communication device 14-2 are thus disconnected.

Figure 4:
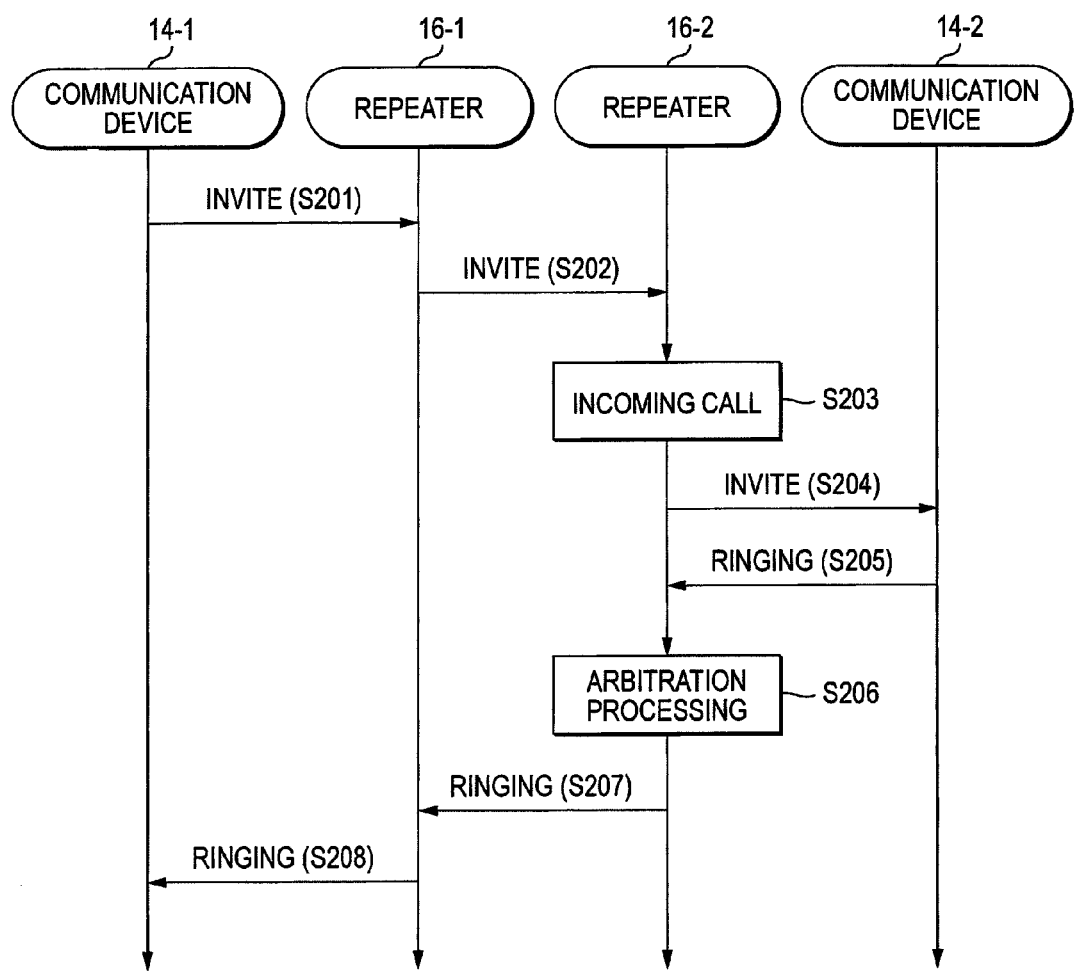
FIG. 4 is a flowchart to show an example of a flow of processing performed by the communication system according to the exemplary embodiment of the invention.

Another example of a flow of processing performed in the communication system 10 according to the exemplary embodiment will be discussed with reference to a flowchart of FIG. 4. In the processing example, an example of a processing flow when the first communication device 14-1 transmits a communication start request to the second communication device 14-2 when the second communication device 14-2 and the third communication device 14-3 are communicating with each other.

First, the communication start request output section 30 of the first communication device 14-1 outputs a communication start request to the second communication device 14-2 as in the processing at 5101 described above (S201). The request repeating section 50 of the first repeater 16-1 relays the communication start request as in the processing at S102 described above (S202).

The request repeating section 50 of the second repeater 16-2 places the communication start request in the first port and the second port of the second repeater 16-2 as an incoming call, as in the processing at S103 described above (S203). The request repeating section 50 of the second repeater 16-2 relays the communication start request from the first port to the second communication device 14-2 as in the processing at S104 described above (S204). On the other hand, the second port of the second repeater 16-2 outputs a response notification indicating connection rejection to the response notification repeating section 52 of the second repeater 16-2 without outputting the communication start request to the second communication device 14-2.

When the communication start request acceptance section of the second communication device 14-2 accepts the communication start request output from the first port of the second repeater 16-2, the response notification output section 34 of the second communication device 14-2 outputs a response notification indicating the second communication device 14-2 is being called (in the processing example, notification of temporary response that the value of response code in SIP is 180 (Ringing)) rather than a response notification indicating the second communication device 14-2 is communicating to the first communication device 14-1 based on the fact that the second communication device 14-2 is communicating with the third communication device 14-3. The response notification repeating section 52 of the second repeater 16-2 accepts the response notification through the first port (S205).

The arbitration processing execution section 54 of the second repeater 16-2 executes arbitration processing between the response notification indicating that calling accepted by the response notification repeating section 52 from the first port and the response notification indicating connection rejection accepted by the response notification repeating section 52 from the second port (S206). In the exemplary embodiment, the arbitration processing execution section 54 determines that the response notification indicating calling has higher priority than the response notification indicating connection rejection, and commands the response notification repeating section 52 of the second repeater 16-2 to output the response notification indicating calling to the first communication device 14-1.

The response notification indicating calling arrives at the first communication device 14-1 (S208) via the first repeater 16-1 (S207) as in the processing at 5107 described above.

Thus, in the processing example, the first communication device 14-1 accepts the response notification indicating the second communication device 14-2 is being called.

Then, if communications of the second communication device 14-2 with the third communication device 14-3 terminate within a predetermined time (for example, 10 seconds) since the second communication device 14-2 output the response notification indicating the second communication device 14-2 is being called, the second communication device 14-2 outputs a response notification indicating that communications with the first communication device are acceptable (for example, notification of definite response that the value of response code in SIP is 200 (OK)) to the first communication device 14-1. This notification arrives at the first communication device 14-1 via the second repeater 16-2, the NGN 12, and the first repeater 16-1. Then, image information is transmitted from the first communication device 14-1 to the second communication device 14-2 according to processing similar to that described above and communications between the first communication device 14-1 and the second communication device 14-2 are disconnected.

On the other hand, if communications of the second communication device 14-2 with the third communication device 14-3 do not terminate when a predetermined time (for example, 10 seconds) has elapsed since the second communication device 14-2 output the response notification indicating the second communication device 14-2 is being called, the response notification output section 34 of the second communication device 14-2 outputs a response notification indicating the second communication device 14-2 is communicating (in the processing example, notification that the value of response code in SIP is 486 (Busy Here)) to the first communication device 14-1. This notification arrives at the first communication device 14-1 according to processing similar to that described above.

The invention is not limited to the exemplary embodiment. For example, in the processing at 5205 described above, the response notification output section 34 of the second communication device 14-2 may output notification of temporary response (notification that the value of response code in SIP is the hundreds) other than the response notification indicating calling to the first communication device 14-1 based on the fact that communications with the third communication device 14-3 are being conducted.

The exemplary embodiment may be applied to a scene where information is transferred between the communication devices according to any other protocol than SIP (for example, H.323, MGCP, etc.). The exemplary embodiment may be applied to communications between the communication systems 10 connected to communication means different from the NGN 12 (for example, a LAN, the internet, etc.). The exemplary embodiment may be applied to any other device than the facsimile machine (for example, a telephone, a stream distribution device, etc.).

The specific numeric values and the character strings described above are for illustrative purposes only and the invention is not limited to the numeric values or the character strings.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

DESCRIPTION OF REFERENCE NUMERALS

10 Communication system, 12 Next generation network (NGN), 14 Communication device, 16 Repeater, 18 LAN cable, 20 Modular cable, 22 Optical fiber, 30 Communication start request output section, 32 Communication start request acceptance section, 34 Response notification output section, 36 Response notification acceptance section, 38 Image information output section, 40 Image information acceptance section, 42 Disconnection request output section, 44 Disconnection request acceptance section, 50 Request repeating section, 52 Response notification repeating section, 54 Arbitration processing execution section, 56 Image information repeating section

What is claimed is:

1. A third communication device comprising:
a request receiving module that receives a communication start request which is output from a first communication device through a relay device; and
a response output module that outputs a response, in a case when the request receiving module receives the communication start request and when the third communication device is communicating with a second communication device,
wherein the response is a notification based on a LAN port of the relay device, and
wherein the relay device outputs a calling response indicating calling by an arbitration processing between the notification and a notification indicating a connection rejection based on an analog port of the relay device.

2. The third communication device according to claim 1, wherein the response output module outputs a response indicating that communications with the first communication device are acceptable to the first communication device after the communications with the second communication device terminates.

3. The third communication device according to claim 1, wherein when a predetermined time has elapsed from the second calling response to the first communication device in a case when the request receiving module receives the communication start request while communicating with the second communication device, if the communications with the second communication device does not terminate, the response output module outputs a communicating response indicating communicating to the first communication device.

4. A communication system comprising:
a first communication device that includes:
a request output module that outputs a communication start request to a second communication device through a relay device; and
a response receiving module that receives a first calling response from the second communication device through the relay device; and
the second communication device includes:
a request receiving module that receives the communication start request output from the first communication device, wherein the communication start request passes through the relay device; and
a response output module that outputs the first calling response indicating calling, in a case when the request receiving module receives the communication start request from the relay device and when the second communication device is communicating with a third communication device,
wherein the relay device outputs a second calling response by an arbitration processing between a notification of calling based on a LAN port of the relay device and a notification indicating a connection rejection based on an analog port of the relay device.

5. A communication system comprising:
a first communication device that includes:
a request output module that outputs a communication start request to a second communication device; and
a response receiving module that receives a calling response indicating calling through a relay device; and
the second communication device includes:
a request receiving module that receives the communication start request output from the first communication device; and
a response output module that outputs a response, in a case when the request receiving module receives the communication start request from the first communication device and when the second communication device is communicating with a third communication device,
wherein the response is a notification based on a LAN port of the relay device, and
wherein the relay device outputs a calling response indicating calling by an arbitration processing between the notification and a notification indicating a connection rejection based on an analog port of the relay device.

6. A non-transitory computer readable medium storing a program causing a computer to execute a process for communication, the process comprising:
receiving a communication start request which is output from a first communication device through a relay device; and
outputting a response, in a case when the communication start request is received and when a second communication device is communication with a third communication device,
wherein the response is a notification based on a LAN port of the relay device, and
wherein the relay device outputs a calling response indicating calling by an arbitration processing between the notification and a notification indicating a connection rejection based on an analog port of the relay device.

7. The third communication device according to claim 1, wherein the relay device outputs the response indicating the connection rejection when the relay device receives a response indicating communicating from a LAN port and a response indicating communication rejection from an analog port.

8. The third communication device according to claim 1, wherein a first port and a second port of the request receiving module receives the communication start request.

9. The third communication device according to claim 1, wherein a LAN port and an analog port of the request receiving module receives the communication start request.

10. The third communication device according to claim 1, wherein the notification based on the LAN port of the relay device is a calling notification indicating calling.

11. The third communication device according to claim 5, wherein the notification based on the LAN port of the relay device is a calling notification indicating calling.

12. The non-transitory computer readable medium according to claim 6, wherein the notification based on the LAN port of the relay device is a calling notification indicating calling.

13. The third communication device according to claim 1, wherein in response to a predetermined time elapsing from a second calling response to the first communication device in a case when the request receiving module receives the communication start request while communicating with the second communication device, and in response to the communications with the second communication device not terminating, the response output module outputs a communicating response indicating communicating to the first communication device.

14. The non-transitory computer readable medium according to claim 6, wherein in response to a predetermined time elapsing from a second calling response to the first communication device in a case when the communication start request is received while communicating with the second communication device, and in response to the communications with the second communication device not terminating, a communicating response indicating communicating is output to the first communication device.

15. A communication device comprising a response notification output module that outputs, to a first port of a relay device, a response notification in which a notification indicating a connection rejection is not output from the relay device by an arbitration processing between a notification from a LAN port of the relay device and a notification indicating a connection rejection from an analog port in a case when receiving a communication start request during communicating with the other device.

* * * * *